3,720,666
6-(SUBSTITUTED-4-OXOURETIDINO-1-YL) PENICILLANIC ACIDS

John H. Sellstedt, King of Prussia, Daniel M. Teller, Devon, and Charles J. Guinosso, Abington, Pa., assignors to American Home Products Corporation, New York, N.Y.
No Drawing. Filed Sept. 2, 1971, Ser. No. 177,485
Int. Cl. C07d 99/16
U.S. Cl. 260—239.1   3 Claims

ABSTRACT OF THE DISCLOSURE

Novel 6 - (2 - substituted-4-oxo-phenyluretidino-1-yl) penicillanic acids are described which are useful as antibacterial agents.

---

This invention relates to novel penicillins represented by the formula

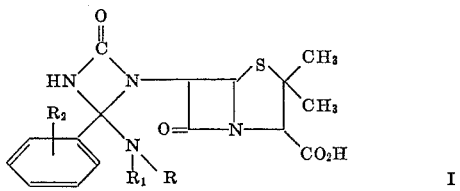

wherein R and/or $R_1$ is selected from the class consisting of (lower)alkyl, aryl(lower)alkyl, or, R and $R_1$ when taken together are $—(CH_2)_n$ where $n=2–8$; $R_2$ is a member selected from the class consisting of hydrogen, lower alkyl, lower alkoxy, halo, nitro, hydroxy and sulfamyl.

The term "lower alkyl" as employed herein includes both straight and branch chain radicals of $C_1$ through $C_7$ carbons as exemplified by methyl, ethyl, propyl, isopropyl, n-butyl, 1,1-dimethyl butyl, n-hexyl, etc. The term "ara(lower) alkyl" means monocyclic and bicyclic carbocyclic lower alkyl radicals exemplified by benzyl, β-phenylethyl, α-phenylpropyl, α-phenylethyl, α-naphthylethyl. The term "halo" means chlorine, bromine, fluorine, and iodine. The term "lower alkoxy" means both straight and branch chain radicals of $C_1$ through $C_7$ carbons as exemplified by methoxy, ethoxy, butoxy, isobutoxy, pentoxy, etc.

The novel products of this invention form salts which are also part of the invention. Acid addition salts include inorganic salts, such as hydrobromide, hydrochloride, sulfate, nitrate, phosphate, borate, etc; and organic salts such as oxalate. Non-toxic pharmaceutically acceptable salts of the acidic carboxylic acid group of the penicillin compounds include potassium, calcium, sodium, ammonium, dibenzylamine, N,N'-dibenzylethylenediamine, N-ethylpiperidine, etc.

The novel penicillins of this invention are prepared according to the following reaction:

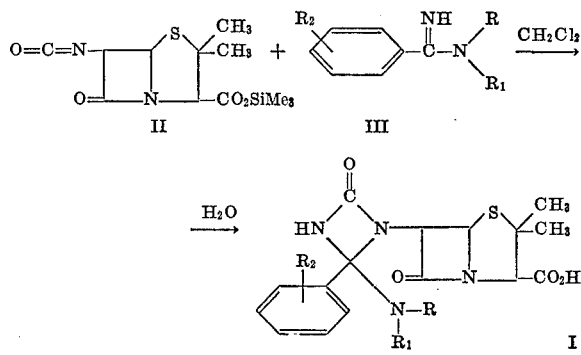

The compounds of Formula III include commercially available compounds and may be prepared in accordance with the procedure described by Shriner and Neumann, Chemical Review (Chemistry of Amidines), vol. 35, pp. 372–373 (1944), the disclosure of which is incorporated herein by reference. The compound of Formula II may be prepared by the procedure described in Example 1.

The novel compounds of the present invention are useful as therapeutic agents in poultry and mammals in the treatment of infectious diseases caused by gram-positive and gram-negative bacteria upon parenteral or oral administration. They are also useful in in vitro applications, such as disinfecting compositions.

The following examples serve to illustrate the invention.

EXAMPLE 1

6-isocyantopenicillanic acid, trimethylsilyl ester

In a 5 liter three-necked flask equiped with stirrer, dropping-funnel, $P_2O_5$-tube and gas inlet tube, through which nitrogen is admitted, 2 liters of toluene and 150.5 g. (697 mmoles) of 6-aminopenicillanic acid are placed. 220 ml. (1579 mmoles) of triethylamine are added and over a period of about 20 min. 250 ml. (approximately 1980 mmoles) of trimethylchlorosilane are added dropwise. Stirring is continued at room temperature for 2.5 hours after completion of the addition. Another one liter of toluene is added and the temperature is brought to $-60°$ C. Next, 90 ml. (646 mmoles) of triethylamine are added. Then, 112 ml. (about 1.8 mole) of liquid phosgene is added while the temperature of the reaction mixture is kept below $-40°$ C. Stirring is continued for 3 hours at $-40°$ C. At this temperature the precipitate formed is filtered off under nitrogen and washed with 500 ml. of toluene. From the combined filtrate and washing the greater part of the phosgene is removed by evaporation at $-40°$ C. The temperature is then slowly brought to $-20°$ C., under reduced pressure. The remaining traces of phosgene, together with trimethylchlorosilane and triethylamine are removed while the temperature is allowed to slowly rise to $+25°$ C., simultaneously most of the toluene is removed. During the evaporation procedure pressure is maintained between 0.5 and 1.5 mm. Hg. The final volume of the solution is 750 ml. containing 263 mg./ml. of the trimethylsilyl ester of 6-isocyanatopenicillanic acid (yield: 80%).

25 ml. of this solution of the isocyanate in toluene is concentrated under reduced pressure with exclusion of moisture, to a volume of about 10 ml. Spontaneous crystallization occurs. 3 ml. of anhydrous toluene are added and the crystalline product is filtered with suction under nitrogen and washed twice with toluene. The crystals are freed from traces of toluene and stored in a nitrogen atmosphere. The yield is about 4 g. of trimethylsilyl ester of 6-isocyanatopenicillanic acid having melting point 85°–88° C. $[\alpha]_D^{20°} = +163.3°$ in toluene. The molecular weight according to mass spectroscopy is 314.

Analysis.—(C, H and N) for $C_{12}N_{18}N_2O_4SSi$. Calc'd. (percent): C, 45.86; H, 5.73; N, 8.92. Found (percent): C, 45.92; H, 5.78; N, 8.87.

EXAMPLE 2

6-(2-dimethylamino-4-oxo-2-phenyluretidino-1-yl)- penicillanic acid potassium salt A solution of N,N-dimethylbenzamidine, available from Aldrich Chemical Co. (1.48 g., 10 mmol.) in dichloromethane (5 ml.) is slowly added to an ice cooled solution of 6-isocyanatopenicillanic acid trimethylsilyl ester (3.14 g., 10 mmol.) in dichloromethane (10 ml.). After 16 hr. at room temperature the solution is stripped and 150 ml. of ethylacetate saturated with water is added. Filter after 1 hr., add sodium chloride, filter, dry with magnesium sulfate and filter. Ether (100 ml.) is added to the filtrate followed by 3 ml. of 2 N potassium 2-ethyl hexanoate in 1 butanol. A white solid is collected and washed with ethyl acetate to yield the above titled compound having the empirical formula $C_{18}H_{21}KN_4O_4S$.

*Analysis.*—Found (percent): C, 48.13; H, 6.17; N, 12.08; S, 12.16.

NMR $(D_2O)\delta$ 1.51 (s., 3, $CH_3C$), 1.64 (s., 3, $CH_3N$), 2.92 (Broad s., 3, $CH_3N$), 3.13 (Broad s., 3, $CH_3N$), 4.20 (s., 1, $CHCO_2K$), 5.10–5.75 (Broad m., 2,

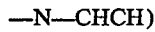

7.15–7.70 (Broad s., 5, aromatic).

EXAMPLE 3

Following the procedure of Example 2, the following compounds may be prepared by reacting 6-isocyanato-penicillanic acid, trimethylsilyl ester with a substituted benzamidine.

| Benzamidine derivatives | Product |
|---|---|
| (a) Benzamidine | 6-(2-amino-4-oxo-2-phenluretidino-1-yl)penicillanic acid. |
| (b) N,N-dibenzylbenzamidine | 6-(2-dibenzylamino-4-oxo-2-phenyl-uretidino-1-yl)penicillanic acid. |
| (c) p-Chloro N,N-dimethyl benzamidine. | 6-[2-dimethylamino-4-oxo-2-(p-chlorophenyl)uretidino-1-yl] penicillanic acid. |
| (d) p-Methoxy benzamidine | 6[2-amino-4-oxo-2-(p-methoxy phenyl)uretidino-1-yl]penicillanic acid. |

The compounds of Formula I of this invention have been found to possess antibacterial activity. Antibacterial screening is carried out by an agar serial dilution technique. Distilled water is used as a vehicle. The stock solution is prepared at 10,000 μg./ml. of substance in the vehicle. Two-fold dilutions are made with sterile water. One ml. quantities of each dilution are incorporated into 9 ml. seed agar in sterile petri dishes. The hardened surface is inoculated with test organisms and incubated 18 hours at 35° C. The end point is reported as a minimal inhibitory concentration (MIC) expressed in μg.ml.; the least amount of test substance that will completely inhibit the test organism. The compound of Example 1 when tested against *Staphylococcus aureus* 6538P and *Staphylococcus aureus* Smith produced a MIC value in each case of 3.90 μg./ml. and when tested against *Bacillus subtilis* prodcunced a MIC value of 0.976 μg./ml.

The compounds of this invention may be used in cleaning or disinfecting compositions (e.g., dairy barns), at a concentraton of about 0.1 to 1% by weight of such compositions dissolved or suspended in a suitable inert carrier for application by washing or spraying.

What is claimed is:

1. A member selected from the group consisting of the compounds having the formula

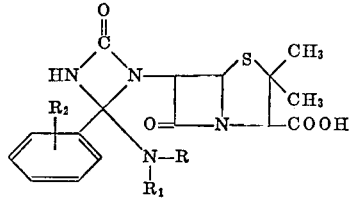

wherein R and $R_1$ are each selected from the class consisting of hydrogen, (lower)alkyl, aryl(lower)alkyl wherein the aryl portion is selected from the group consisting of phenyl and naphthyl; or R and $R_1$ taken together form $-(CH_2)_n$ wherein $n$ is a whole number from 2 through 8; $R_2$ is a member selected from the class consisting of (lower) alkyl, (lower)alkoxy, halo, nitro, hydroxy, and sulfamyl; and their non-toxic addition salts. affi, ))i o)u ifoi,232,iahe(T8i[18]

2. A compound according to claim 1 wherein each of R and $R_1$ are lower alkyl.

3. A compound according to claim 1 which is 6-(2-dimethylamino - 4 - oxo - 2 - phenyluretidino-1-yl)penicillanic acid.

References Cited

UNITED STATES PATENTS

| 3,471,475 | 10/1969 | Clark et al. | 260—239.1 |
| 3,538,083 | 11/1970 | Brant et al. | 260—239.1 |
| 3,621,011 | 11/1971 | Russell et al. | 260—239.1 |

NICHOLAS S. RIZZO, *Primary Examiner*

U.S. Cl. X.R.

424—271